May 19, 1964 G. SACCHI Re. 25,579

SPEED CHANGE DEVICE HAVING RESILIENTLY DEFORMABLE WHEELS

Original Filed Jan. 24, 1958 4 Sheets-Sheet 1

Inventor
Giulio Sacchi
by Stevens, Davis, Miller & Mosher
his attorneys

May 19, 1964 G. SACCHI Re. 25,579

SPEED CHANGE DEVICE HAVING RESILIENTLY DEFORMABLE WHEELS

Original Filed Jan. 24, 1958 4 Sheets-Sheet 2

Inventor
Giulio Sacchi
by Stevens, Davis, Miller & Mosher
his attorneys

May 19, 1964 G. SACCHI Re. 25,579

SPEED CHANGE DEVICE HAVING RESILIENTLY DEFORMABLE WHEELS

Original Filed Jan. 24, 1958 4 Sheets-Sheet 3

Inventor
Giulio Sacchi
by Stevens, Davis, Miller & Mosher
his attorneys

May 19, 1964 G. SACCHI Re. 25,579

SPEED CHANGE DEVICE HAVING RESILIENTLY DEFORMABLE WHEELS

Original Filed Jan. 24, 1958

4 Sheets-Sheet 4

Inventor
Giulio Sacchi
by Stevens, Davis, Miller & Mosher
his attorneys

United States Patent Office

Re. 25,579
Reissued May 19, 1964

25,579

SPEED CHANGE DEVICE HAVING RESILIENTLY DEFORMABLE WHEELS

Giulio Sacchi, Via Borgonuovo 10, Milan, Italy

Original No. 3,020,782, dated Feb. 13, 1962, Ser. No. 711,043, Jan. 24, 1958. Application for reissue Jan. 23, 1963, Ser. No. 253,517
Claims priority, application Italy Jan. 24, 1957
18 Claims. (Cl. 74—796)

Matter enclosed in heavy brackets [ ] appears in the original patent but forms no part of this reissue specification; matter printed in italics indicates the additions made by reissue.

This invention is related to a speed changing mechanism having speed ratios which can be varied in a continuous way and to this end resort is had to the frictional engagement between a rigid wheel and a deformable wheel, the latter being deformable due to radial pressure exerted by the former.

According to the invention, the variation of the speed ratios is obtained by varying the distance between the axes of said two wheels.

By the term "wheel" it is intended to connote, throughout the present specification and the claims appended thereto, any rotatable body having a rolling path either on a surface facing the outside or facing the centre of the body, said body being either movable or stationary.

An example of a resiliently deformable wheel is a ring provided with a pneumatic tire either on its internal or external cylindrical surface. It is intended, however, that the invention be not limited to the kind of deformable pneumatic tire referred to hereinafter.

When a pneumatic tire is in frictional engagement with a rigid surface and has a rolling movement thereon, the length, measured on the rigid surface, along which there is a rolling contact during a single revolution of the pneumatic tire, varies, even to a relatively small extent, depending upon the pressural deformation to which the tire is subjected and therefore, if there is a transmission of power between said pneumatic tire and said rigid surface, in either direction, the transmission ratio is varied as a function of the pressural deformation above-mentioned.

It has already been proposed to employ a pneumatic tire for a frictional power transmitting arrangement for example in the British Patents 158,429 and 501,758.

In these known transmission devices, the position of the axes of rotation of the wheel provided with a pneumatic tire and the rigid wheel is invariable, so that such an arrangement is not suited for varying the speed ratio.

Since the variation of the speed ratio obtained by pressural deformation of a rolling surface in frictional engagement with another rigid rolling surface is relatively limited, the present invention is also comprehensive of the possible employment of means capable of effecting such a variation until values are arrived at which are of use in a number of practical applications such as the change speed gears of automotive vehicles.

The invention will be better understood by the following description of some exemplary embodiments thereof, aided by the accompanying drawings.

Figure 1:
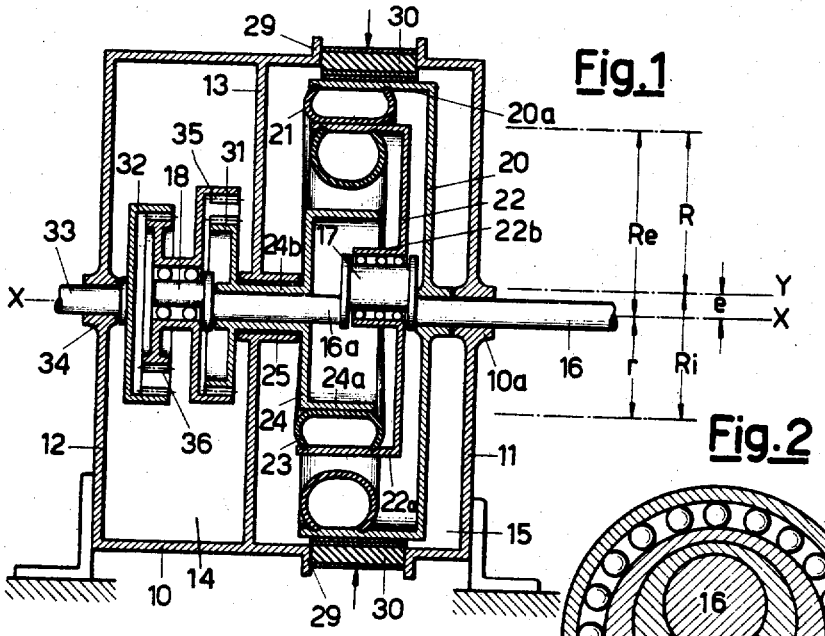
FIG. 1 is a diagrammatical axial cross-sectional view of an embodiment of the invention.

Reference being now had to FIG. 1 of the accompanying drawings 10 connotes a fixed cylindrical casing having two end walls 11, 12, and an intermediate partition 13 that divides the inner space of casing 10 into two adjacent chambers 14, 15. Chamber 14 is intended for housing a gear mechanism. Conversely, chamber 15 is intended for containing pairs of mutually and frictionally engaging members.

Numeral 16 connotes the input or driving shaft of the mechanism, this shaft axially entering housing 10 through a bushing 10a lodged in the end wall 11. This input or "primary" shaft 16 bears in the chamber 15 an eccentric 17, the eccentricity e whereof with respect to the axis X—X of the shaft 16 can be varied from zero to a selected upper limiting value. Character Y designates the geometric axis of the eccentric 17. To render the drawing clearer, the specific structure of this eccentric has not been shown in detail in FIG. 1 and will be fully described with reference to FIG. 2, it being understood, however, that any equivalent structure can be as well employed.

An extension 16a of shaft 16 enters, through partition wall 13, into the chamber 14, where it is terminated by an eccentric 18, the eccentricity whereof is constant. On the shaft 16 and within chamber 15 a wheel 20, having a rim 20a solid therewith and coaxial with shaft 16, is mounted for rotation. Wheel 20 and its associated rim 20a is made of a metallic material and is of a rigid character. On the inner face of the rim 20a there is affixed a pneumatic tire 21, the rolling surface whereof confronts the shaft 16. Due to this feature, throughout this specification the expression "negative tire" will be used for indicating any tire the rolling surface of which is directed toward the centre, contrary to the normal motorcar tires which have a rolling surface radially directed toward the outside and which therefore could be styled "positive tires."

On the eccentric 17 is mounted for rotation, by means of a ball bearing, a second metal wheel 22, having a rigid metallic cylindrical rim 22a. The overall diameter of said rim 22a is greater than the inner diameter the tire 21 has when it is inflated in unconstricted conditions. By varying the eccentricity "e" of the eccentric 17 it is apparent that the rim 22a is allowed to assume either a position in coaxial relationship with respect to shaft 16 in which position said rim contacts the tire 21 along its whole peripheral contour, or positions in misalignment with respect to shaft 16 (as shown in the drawing) in which the rim 22a presses the tire 21 and is out of engagement therewith along a certain portion of its periphery.

To the inner cylindrical surface of the rim 22a there is affixed a second negative tire 23, the rolling surface of which confronts the rim 24a of a metal rigid wheel 24 the hub 24b whereof is mounted for rotation on the extension 16a of the shaft 16 and is borne by a bushing 25 solid with and overhanging from the partition wall 13. The outer radius of the rim 24a is designated by the reference character r in the drawing, whereas the outer radius of the rim 22a is designated by the character R. When the rim 22a engages the tire 21 as shown in the drawing, it rolls over the tire on a circular path having a radius Re, which can be regarded, by way of approximation, as the rolling radius of the tire 21 in these conditions. Likewise, the rim 24a rolls over the tire 23 along a circular path having a radius Ri which can be regarded, by way of approximation, as the rolling radius of the tire 23.

It is apparent that the arc of contact between the drum 22a and the tire 21 will always be diametrally opposed to the arc of contact between the rim 24a and the tire 23.

In the peripheral wall of the casing 10 there are formed, in diametrally opposed positions, two openings 29, wherethrough two brake shoes 30, associated with the cylindrical outer surface of the rim 20a of wheel 20, penetrate. When these brake shoes are pressed against drum 20a, this latter can be regarded as being solid with casing 10, that is, fixed.

The hub 24b of the wheel 24 is terminated, within the chamber 14, by an outer toothed wheel 31, which is thus solid with the wheel 24 and in coaxial relationship with shaft 16. An innerly toothed wheel 32 is keyed to the output or driven shaft 33 of the transmission device, which shaft is journaled in a bearing 34 mounted through the end wall 12 of the casing 10. As it can be seen in the drawing, the output shaft 33 is located along the same axis X—X of the incoming shaft 16. On the eccentric 18 there are mounted, by means of a ball bearing, an innerly toothed wheel 35 and an outerly toothed wheel 36 both wheels being mutually solid and in mesh with the wheels 31 and 32, respectively. As it can be appreciated, the wheels 31, 32, 35 and 36 actually form a hypocyclic gearing, whose wheels 31, 32 are sun wheels whereas the wheels 35, 36 fulfill the function of planetary gears. In such an arrangement there are combined two rotatory movements coming from the hub 24b to the wheel 31, and from the shaft 16, 16a to the crank 18 bearings the planetary gears 35, 36 respectively.

Figure 2:
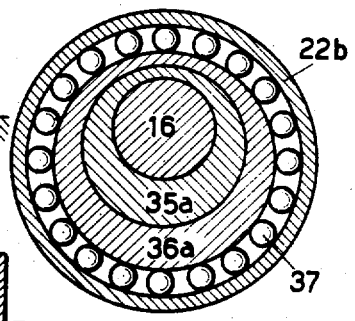
FIG. 2 is a cross-sectional view of one of the possible means capable of varying the eccentricity of one of the wheels shown in FIG. 1 and consequently varying the speed ratio.

The device for varying the eccentricity e, illustrated by way of example only in FIG. 2, is known per se and is based on two complementary eccentrics 35a, 36a having a circular contour.

The eccentric 35a is mounted for rotation on the shaft 16 and rotatably supports the eccentric 36a. This latter affords, by virtue of its circular profile, a rolling path for the spheres of 37 which support the hub 22b (see also FIG. 1) of the rigid wheel 22.

By varying the mutual angular relationship between the eccentrics 35a, 36a the eccentricity of the bearing and of the hub 22b with respect to the shaft 16 is also varied.

In FIG. 2 the eccentrics 35a, 36a are shown in the position corresponding to the maximum eccentricity of the wheel 22.

The means for varying the angular relationship between the eccentrics 35a, 36a during movement are known per se and they are not described in detail herein since they are well known to those skilled in the art.

Figure 3:
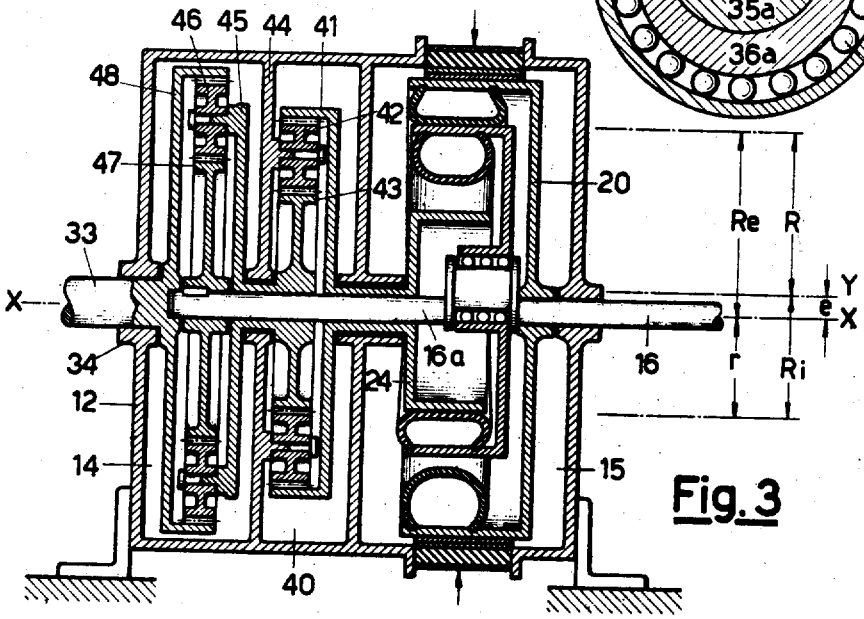
FIG. 3 is a diagrammatical sectional view of another embodiment of the invention.

Having now reference to FIG. 3, this figure shows another embodiment of the present invention, in which three chambers are adopted instead of the two chambers shown in FIG. 1. Chamber 15 containing the deformable bodies is composed in very much the same way as chamber 15 as shown in FIG. 1. Chamber 40 houses a fixed-ratio reversing gear. Chamber 14 houses an epicyclic gearing as chamber 14 of FIG. 1, but of different description. In particular, the internally toothed wheel 41 rotates with the same rotation rate as the rigid wheel 24 whereto it is solid and, through the gears 42 the pins of which are affixed to the partition wall 44, drives to rotation in reverse sense the externally toothed wheel 43. In the chamber 14 the planetary wheel carrier 45 rotates at the same rotation rate as the toothed wheel 43 whereto it is solid and carries the planetary gears 46. To the epicyclic gearing in chamber 14 the input rotation rate is also transmitted, because the externally toothed wheel 47 is keyed on the extension 16a of the input shaft 16.

The resultant of these two rotation rates is eventually transferred, by means of the internally toothed wheel 48, which also is in mesh with the planetary gears 46, to the output shaft 33 whereto the toothed wheel 48, is affixed.

Figure 7:
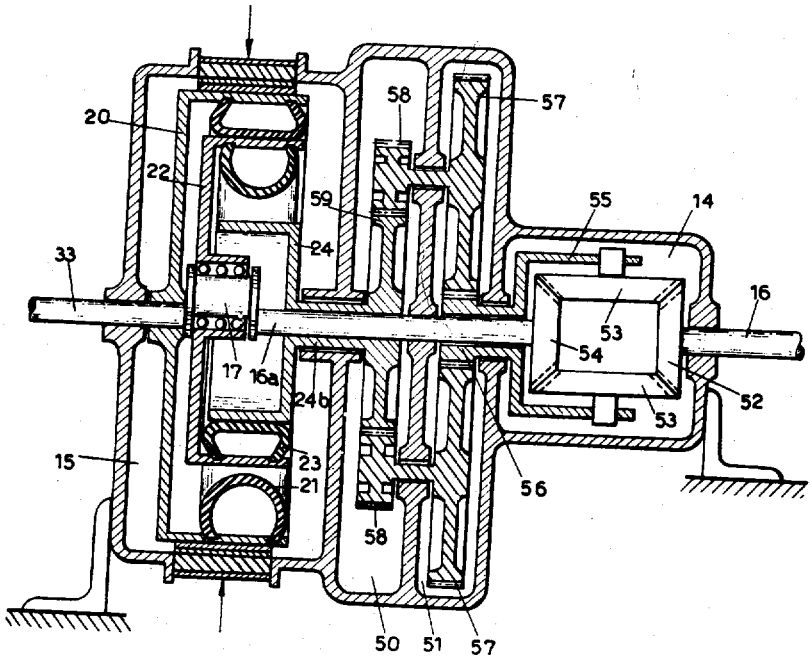
FIG. 7 is a diagrammatical view of still another embodiment of the invention.

Another embodiment of the invention which in many a case of practical employment can afford advantages as far as efficiency, cost and weight saving are concerned, as compared with the embodiments hereinbefore described, is that shown in FIG. 7.

In this embodiment, similarly to those of FIGS. 1 and 3, there is again a chamber 15 with deformable members, identical to that already described with the exception that the deformable members are at the output end of the device and not at the input end as it has been shown in FIGS. 1 and 3, and there is also a chamber 14 which houses an epicyclic gear. This latter, as in the case shown in FIG. 3, is characterized in that it has a negative constant which in FIG. 7 equals unity so that the device is a conventional differential gearing of the kind adopted in automative vehicles.

There is also a gear box 50—51 similar to chamber 40 of FIG. 3.

More particularly, the input shaft 16 moves the sun gear 52 which is in mesh with the two planetary gears 53, and these latter, in turn, mesh with the gear 54 which moves the shaft 16a. The planetary gear carrier 55 is driven by the gear 56 which, via the gears 57 and 58 solid with one another and rotating in a bearing housed in the housing of the device, and also via gear 59, is driven by the rigid rim 24 in the same direction of rotation. From this point onwards the device is equal to those already described with the exception that the eccentric 17 is solid with the output shaft 33 and not to the input shaft 16.

In order to describe in a clearer way the operability of the embodiments shown in FIGS. 1 and 3, and also to the end of illustrating other embodiments which are sufficient to permit the manufacture of a speed change device according to the present invention, in FIGS. 4, 5, 6a and 6b some arrangements of the members contained in the chambers 15 of FIGS. 1 and 3 are diagrammatically shown. In FIGS. 4, 5, 6a and 6b like reference numerals have been used to connote parts equal or similar to those shown in FIGS. 1 and 3.

Figure 4:
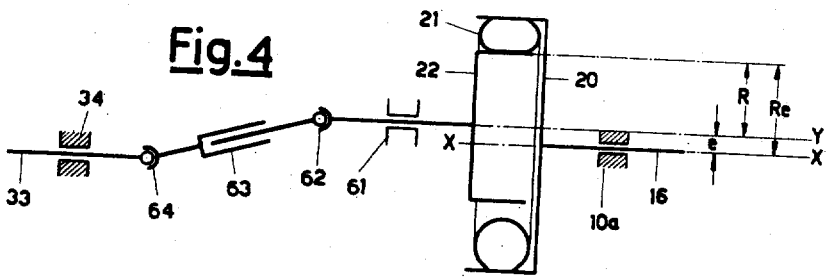
FIG. 4 is a diagrammatical showing of a simplified embodiment of the invention.

In FIG. 4 the input shaft 16 affixed to the inner rim of the bearing 10a carries the rigid wheel 20 inside which the deformable body 21 is anchored. On this latter the rigid wheel 22 rests and an innerly and frictional engaging coupling device is thus obtained. Since the radius R of the wheel 22 is smaller than the rolling radius $R'_e$ of the deformable member 21, the axle of wheel 22 has a rate of rotation $n_u$ greater than the rate of rotation $n_e$ of the input shaft 16.

The mathematical relationship between the two rotation rates $n_u$ and $n_e$ is also such as to define the rolling radius $R'_e$ and is as follows:

$$n_u = +n_e \frac{R'_e}{R} \qquad (1)$$

(It is to be noted that in the drawing there is shown $R_e = R + e$ and $R_e$ is in any case greater than the rolling radius $R'_e$. This condition is valid for all the figures in which $R_e$ and $R_i$ are shown.)

The rate of rotation $n_u$ is transferred to the output shaft 33, rotating in the bearing 34, via the Cardan joints 62, and 64, and the axially slidable joint 63. When the position of the bearing 61 is varied, for example by means of devices of the kind described in connection with FIG. 2, so as to increase the eccentricity "e," the deformable body 21 is further compressed and by so doing the radius $R'_e$ is also increased.

Therefore, as it can be seen in the Formula 1, $n_u$ is further increased. A device for multiplying the rates of rotation is thus obtained and is capable of operating at varying speed ratios without displacing the output shaft 33, since the slidable joint 63 permits operation of the device irrespective of the value of "e." By using the device invertedly with respect to preceding description, a device for reducing the rate of rotation is obtained. The practical limits of operation (if the size of the deformable bodies and, in the particular case of tires, if the values of the fluid pressure existing thereinside, are sufficient to transmit the desired torques) consist of the value of the maximum ratio (or minimum, if a reduction of the rate of rotation is desired) obtainable consistent with a sufficient life and satisfactory efficiency. As a matter of fact the variation of the rolling radius $R'_e$, obtained by pressural deformation of the deformable bodies is first of all a function of the kind of tire adopted, of their shape and peripheral outline, of the pressural reactions mutually transmitted during contact and also of the corresponding features of the rigid wheels with which the deformable bodies mate.

Under any circumstances, irrespective of the kinds and sizes adopted, it is not advisable to exceed certain limits of pressural deformation; moreover, since the variations of $R'_e$ are smaller than those of the pressural deformations which causes them, it can be concluded that in the Formula 1 the ratio $$\frac{R'_e}{R}$$

which is the ratio of the rates of revolution cannot vary to a large extent.

Variations in the rates of revolution as great as 10% to 20% as a maximum can be obtained, providing that very light tires are used and without causing excessive wastage of power (with inherent heat build-up and internal overheating of the tire) and that significant slippages between the contacting surfaces are avoided, which latter lead to instability of operation. Consequently, in those fields in which small variations of the rotation rate are of interest, the device shown in FIG. 4 can find useful applications whereas in such cases, as in the automotive vehicles, in which variations as great as 5 to 1 are required, the use of the device of FIG. 4 is not advisable. Also the serial arrangement of a number of elements such as that shown in FIG. 4 is of little interest in the field last cited since the efficiency of the cumulative transmission becomes in such cases lower and lower.

Figure 5:
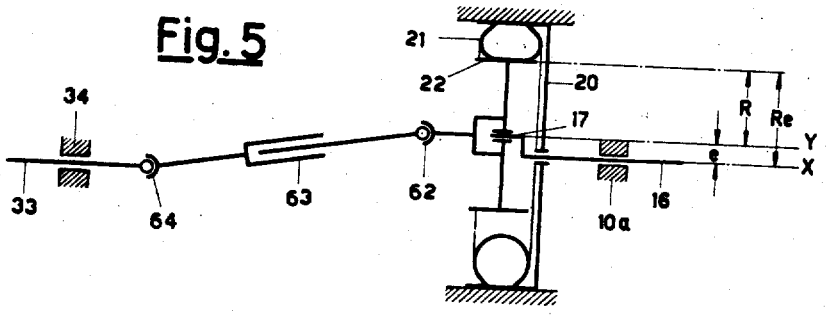
FIG. 5 is a diagrammatical view of another simplified embodiment of the invention.

FIGURE 5 shows an embodiment in which the kinematic operational limits are opposed to those of the preceding case. Let us assume that the input shaft 16 and its associated eccentric 17 move in an epicycloidal movement, the rigid wheel 22 on the deformable body 21, and that the resultant rate of rotation of 22 is collected by employing the same devices shown in FIG. 4 with the same reference numerals 62, 63 and 64 (as an alternative, a flexible shaft may be employed).

If $n_e$ is the rotation rate of the input shaft 16 and $n_u$ is that (in opposed sense) of the output shaft 33, equal to that of the shaft solid with the wheel 22, in order to obtain a mathematical relationship between $n_u$ and $n_e$ analogous to that of Formula 1, let us imagine to rotate together, at a rate of rotation $-n_e$ the supports of the bearing 10a, those of the deformable body 21 and those of the bearing 34, for example by rotating the floor of the room in which the whole apparatus is installed. Let us now imagine to view the whole device from a viewpoint which does not rotate with the supports now mentioned, for example from a viewpoint outside the room in which the whole device is housed. Then the shaft 16 still makes $n_e$ revolutions in a certain sense with respect to external rim of its bearing but this latter makes, at the same time, $n_e$ revolutions in the opposite sense so that the shaft 16 and its associated eccentric 17 appear stationary as viewed from outside. The deformable body, conversely, makes $-n_e$ revolutions and the output shaft 33, as it can be appreciated by making a reasoning similar to that made for the bearing 34, rotates at $n_u-n_e$ revolutions per minute. For an outside viewer, therefore, since the eccentric 17 appears to be stationary, the apparatus is identical to that shown in FIG. 4. Hence, a relationship analogous to the Formula 1 is valid, thus:

$$\frac{n_u-n_e}{-n_e}+\frac{R'_e}{R}>1 \qquad (2)$$

The above relationship, developed, becomes:

$$n_u=-n_e\left(\frac{R'_e}{R}-1\right) \qquad (2')$$

Since $R'_e$ is greater than R it is verified that $n_u$ is contrary to $n_e$. Moreover, since by increasing "e" also $R'_e$ is increased, the magnitude of $n_u$ increases as "e" is increased. However, since $R'_e$ cannot have been increased to a very large extent for the reason stated hereinbefore, the magnitude of $n_u$ is, under any circumstances, very much smaller than $n_e$. For example, if $R'_e$ is greater than R by 10%, $n_u$ is ten times smaller than $n_e$. If $$\frac{R'_e}{R}=1.01$$

one obtains $$n_u=-\frac{1}{100}n_e$$

and so forth. By employing this embodiment, therefore, contrary to what is obtainable with the arrangement of FIG. 4, it is possible to obtain very high reduction rates only.

This application is of utility only in the case in which variable but very high reduction rates (about 1 to 10) are desired.

Figure 6A:
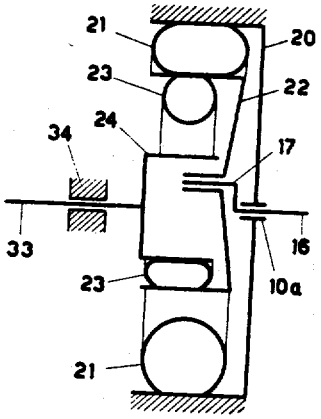
FIG. 6a is a diagrammatical view of a further simplified embodiment of the invention.
Figure 6B:
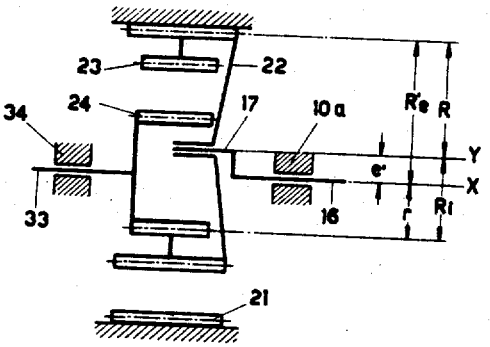
FIG. 6b illustrates the same scheme of FIG. 6a but all the contacting surfaces are of a rigid character.

Considerations very similar to those now set forth apply to the case shown in FIG. 6a. FIG. 6a shows in a diagrammatic fashion the arrangement with the deformable bodies as existing in the chambers 15 of FIGS. 1 and 3. FIG. 6b repeats in an even more schematic way the embodiment of FIG. 6a with the assumption that the external deformable body 21 and the wheel 22 behave similarly to gears, the pitch circles whereof have radii $R'_e$ and R respectively, and also assuming that the internal deformable body 23 and the rigid wheel 24 behave similarly to gears, the pitch circles whereof have radii $R'_i$ and r, respectively. For this figure, on account of the identity of numerals indicating the various component parts, the disclosure given in connection with FIG. 1 applies.

Calculations will now be made having reference to FIG. 6b. Calling also in this case $n_e$ the rotation rate of the input shaft 16 and $n_u$ the rotation rate of the output shaft 33, and making the same assumption to rotate the supports at a rotation rate $-n_e$, it is possible to have the shaft 16 and its eccentric 17 stationary and there can be written the relationship:

$$\frac{n_u-n_e}{-n_e}=\Psi_v \qquad (4)$$

that is, $$n_u=-n_e(\Psi-1) \qquad (4')$$

wherein:

$$\Psi_v=\frac{R'_e}{R}\times\frac{R'_i}{r}>1 \qquad (5)$$

In fact, there are here two serially arranged couplings in lieu of the single one of FIG. 5. Therefore, also in this instance, $n_u$ is contrary, as to its sense, to $n_e$ and its magnitude is increased as the pressural deformation of the deformable body is increased. There is in this way a kinematic configuration identical to that of FIG. 5. However, since $\Psi_v$ is greater than $$\frac{R'_e}{R}$$

it can be inferred, by comparing (4') and (2'), that the revolutions $n_u$, the eccentricity "e" being the same, are, in the case of FIG. 6, of a greater magnitudue than that of the case of FIG. 5. By assuming, for the sake of simplicity, that $$\Psi_v = \frac{(R'_e)^2}{R}$$

one obtains, the ratio $$\frac{R'_e}{R}$$

being the same, the following relationship:

$$n_{u6} = n_{u5}\left(\frac{1+R'_e}{R}\right) > n_{u5}$$

Hence, the ratios $$\frac{n_u}{-n_e}$$

may also be not so high as in the case of FIG. 5.

Moreover, the embodiments of FIGS. 5 and 6 exhibit the drawback that the output rotation rate increases as the eccentricity "e" is increased, that is, as the pressural deformation of the deformable bodies is increased.

If the normally adopted rotation rate is not very much smaller than the input rotation rate, the speed changing device is normally to operate with its deformable bodies pressurally deformed to a large extent and therefore they are liable to cause wastage of power which in some instances can be significant and impair the efficiency and the life itself of the whole device, unless the component parts are designed of a suitable size.

Furthermore, if the pressural deformation of the deformable bodies is increased, the adherence and therewith the capacity of resisting without slippages the output torques are also increased.

In the conventional transmission devices, conversely, which generally are such as to give a transmitted power of constant or almost constant value, the torques are decreased as the output rates of revolution are decreased. There is thus the unfavorable circumstance that the possibility is afforded to withstand high torques when the torques are low and vice-versa.

Therefore, the practical application embodying the arrangements shown in FIGS. 4, 5 and 6 may be of interest only in the following instances:

(1) High reductions of the revolution rates and ratios variable to a limited extent;
(2) Transmission devices for which there are no imperative space requirements and whenever the cost of other apparatus giving the same results is higher;
(3) Installations in which the loss of efficiency has not a particular importance.

By introducing the epicyclic gear of the kind housed in the chamber 14 of FIG. 1 or any other known gear having analogous operational features not only the situation is reversed in the sense that to high revolution rates correspond low pressural deformations of the deformable bodies and consequently there are low losses of the power transferred through said bodies, but there is furthermore obtained that this power is, at least limitedly to a certain range of revolution rates, but a fraction of the total transferred power and can even be zero in the case in which the eccentricity is zero since in this case the deformable bodies are stationary as will be explained in connection with the description of the operation.

On account of these two factors, one obtains the result (hitherto deemed impossible to attain) of having a continuous speed changing device the efficiency of which is very near to and in some instances even higher than the conventional speed change devices having fixed reduction ratios.

It results from the foregoing that it is necessary to adopt deformable bodies capable of absorbing a small amount of power during their rolling and it is thus advisable to adopt deformable bodies of a kind similar to pneumatic tires and these bodies must fulfill, as to the materials employed in their construction and the arrangement of the materials themselves, specifications similar to those of the pneumatic tires, but adapted to the particular purpose of this invention. In particular, the walls intended to contain the inflating fluid must be very thin and of low hysteretical properties.

For example to transfer powers of the order of 40 to 50 H.P. there have been experimentally employed containers having a thickness of the order of 3 millimetres, reinforced with a number of cord plies smaller than that normally adopted for the automotive tires of corresponding size, the arrangement of the cords in the carcass having been suitably chosen.

From the foregoing it results that it is also necessary to have, under any conditions of pressural deformation, a stable and durable mating between the deformable body and the rigid wheel. This suggests the arrangement which constitutes a preferred embodiment of the present invention. According to this preferred form, the diameter of the rigid wheels must be equal to or greater than that of the deformable bodies when these latter are inflated, assuming that the rigid wheels, with which the deformable bodies are intended to mate in operation, are removed.

By adopting these expedients as to the deformable bodies and on account of the fact that the power aliquot transferred therethrough is, for a greater fraction of the revolution rate range, smaller than the total transmitted power, the efficiency rises to quite unexpected values and at the same time, as it has been experienced, the risks of overheating are overcome if suitable cooling arrangements are provided to ventilate the metal parts which are in contact with the deformable bodies and absorb almost totaxlly the heat built up thereby.

Let us examine now the operation of the embodiments shown in FIGURES 1 to 3 inclusive. Calling $n_e$ the revolution rate of the input or driving shaft entering the speed changing gear (this shaft being connected to a source of motive power) and $n_u$ the rate of revolution of the output or driven shaft coming out of the speed change gear 33 (and connected to an apparatus utilizing motive power), so that the direction along which the power is transmitted, as viewed in the drawings, is from the right to the left. Calling n the rate of revolution of the externally toothed wheel 31 of FIG. 1, and of the internally toothed wheel 41 of FIG. 3, the description of the operation of the device of FIG. 1 will be initially set forth. On account of what has been said in connection with FIG. 5 the mathematical relationship can be written as follows:

$$\frac{n-n_e}{-n_e} = \Psi_v > 1 \qquad (7)$$

or, otherwise stated, $$n = -n_e(\Psi_v - 1) \qquad (7')$$

wherein $\Psi_v$ has the value given by the Formula 5.

The Formula 7′ is thus the characteristic equation of the chamber 15 wherein the deformable bodies are housed. In the chamber 14 two rates of revolution are introduced, that is, the rate of revolution $n_e$ due to the shaft 16 extended by the portion 16a and as far as the eccentric 18, and the rate of revolution n of the wheel 31. Therefore the epicyclic gear of the chamber 14 combines these two rates of revolution into a single rate of revolution $n_u$, which is that of the outcoming or secondary shaft 33. By making the assumption of imagining to rotate the external supports of the device at the negative rate of revolution $-n_e$ (in this particular case it can even be assumed to rotate at the rate $-n_e$ the supports solid with the walls 11 and 12 as well as the stators of the source of motive power and of the apparatus utilizing the transmitted motive power), the Formula 10, set forth below, is arrived at, with the constant $\Psi\Psi_v$ of the two serially arranged gears, the eccentric member 18 can be thought of as stationary and it is possible to write the relationship:

$$\frac{n_u-n_e}{n-n_e}=\Psi>0 \qquad (8)$$

This relationship in its generalized form is known as the Willis's formula. $\Psi$ is the constant which characterizes the chamber 14 and has fixed values whereas $\Psi_v$ characterizes the chamber 15 and has values which vary as the eccentricity "e" is varied.

The constant $\Psi$, if the symbol $r_{31}$ connotes the radius of the pitch circle of the gear wheel 31 and thus likewise for the other gears (every pair of gears have equal module), has the following mathematical expression:

$$\Psi=\frac{r_{31}}{r_{35}}\times\frac{r_{36}}{r_{32}}=\frac{r_{31}}{r_{32}}\times\frac{r_{36}}{r_{35}}<1 \qquad (9)$$

From the Formulas 7 and 8 one obtains:

$$n_u=n_e(1-\Psi\Psi_v) \qquad (10)$$

When the wheel 20 is not braked but rotates at a rate of revolution $n_s$, which takes place when starting the mechanism and in general during some transient phases of the movement, the Formula 7 should be replaced by the following:

$$\frac{n-n_e}{n_s-n_e}=\Psi>1 \qquad (11)$$

and consequently the Formula 10 becomes:

$$n_u=n_e\left[1-\Psi\Psi_v\left(1-\frac{n_s}{n_e}\right)\right] \qquad (12)$$

On bearing the foregoing mathematical developments in mind, the operation of the device will be shortly described hereinafter.

As the eccentricity "e" is increased, $R'_e$ and $R'_i$ are also increased and therefore $\Psi_v$ is increased. Consequently, the revolution rate at the output end of the mechanism is decreased so that the speed changing mechanism does not exhibit the drawbacks hereinbefore illustrated in connection with the embodiments shown in the FIGS. 5 and 6. In particular, if the eccentricity is e=0 then $\Psi=1$ and the deformable bodies, as well as the wheel 31, are stationary.

The operation of the embodiment according to FIG. 3 will be now described. In this case, intermediate between the chambers 14 and 15 there has been introduced a third chamber 40 which houses a reversing gear having a fixed ratio $-\tau$ and in the chamber 14 the type of epicyclic gear has been changed. More particularly, instead of the wheel 31 of FIG. 1 there is an internally toothed wheel 41 which is in mesh with the gears 42 the pin whereof is borne by the wall 44. These gears 42 reverse the rotary motion of the wheel 43. Calling n the revolution rate of the wheel 41 and n' that of the wheel 43, one obtains, while retaining the same notations adopted hereinbefore for the radii of the pitch circles:

$$-\tau=\frac{n'}{n}=-\frac{r_{42}}{r_{43}} \qquad (16)$$

Now, therefore $$\tau=\frac{r_{42}}{r_{43}}>1$$

The wheel 43 moves at its same revolution rate the carrier 45 whereto it is solid. On this carrier-member 45 the planet gears 46 connect the first sun gear 47, keyed to the extension 16a of the input shaft 16, to the output sun gear 48 keyed to the output shaft 33.

For the chamber 14, therefore, the following Willis' relationship is valid;

$$\frac{n_u-n'}{n_e-n'}=-\Psi \qquad (17)$$

wherein the negative sign for $\Psi$ is justified in that 47 and 48 are an externally and an internally toothed wheel respectively, so that the sense of rotation is reversed in passing from one wheel to another assuming the gear carrier 45 as being stationary.

Finally, it is obtained:

$$\Psi=\frac{\tau_{47}}{\tau_{48}}<1 \qquad (18)$$

From the Formulas 7, 16 and 17 one obtains:

$$N_u=-n_e[\Psi-\tau-(\Psi+1)(\Psi-1)] \qquad (19)$$

If the wheel 20, in some transient phases, is not stationary, it is necessary to combine the relationship (11), (16) and (17) and it is obtained:

$$n_u=-n_e\left\{\Psi-\tau(\Psi+1)\left[\Psi_v\left(1-\frac{n_s}{n_e}\right)-1\right]\right\} \qquad (20)$$

In this case, therefore, the output motion is reversed (in the case of $$n_s=0) \text{ if } \Psi>\tau(1+\Psi)(\Psi-1)$$

or $$\Psi>\frac{\Psi_v-1}{1+\frac{1}{\tau}-\Psi_v}$$

which is the most common case in practice.

On bearing these premises in mind if "e" is increased and consequently $\Psi_v$, the magnitude of the revolution rate $n_u$ decreases and it is $n_u=-n_e\Psi$ when $\Psi_v=1$. The advantage over the case of FIG. 1 is apparent if it is considered that in the Formula 10 it is $$\frac{\partial|n_u/n_e|}{\partial\Psi_v}=-\Psi_1$$

where in the case 1, that is $\Psi_1$ is smaller than 1 and, conversely, in the Formula 19 the derivative is, as to its magnitude, very much greater since it amounts to $$\frac{\partial|n_u/n_e|}{\partial\Psi_v}=-\tau(\Psi_3+1)$$

where $\tau>1$ and where $\Psi_3+1>\Psi_1$. Consequently, with a value of $\Psi$ a little greater than 1, great variations are obtained. The operation of the embodiment shown in FIG. 7 is as follows: Starting from the rate of revolution $n_u$ of the output shaft 33 it is possible to calculate the revolution rate of the wheel 59 by adopting the Formula 7'. One obtains:

$$n_{59}=-n_u(\Psi_v-1) \qquad (101)$$

Assuming $$\lambda=\frac{r_{59}}{r_{58}}\times\frac{r_{57}}{r_{56}} \qquad (102)$$

one obtains:

$$n_{55}=+\lambda n_{59}=-\lambda n_u(\Psi_v-1) \qquad (103)$$

Applying now the Willis' formula to the differential one obtains:

$$\frac{n_u-n_{55}}{n_e-n_{55}}=-1 \qquad (104)$$

By introducing into the Formula 104 the relationships 101, 102, 103 one obtains:

$$n_u=\frac{-1}{1+2\lambda(\Psi_v-1)}\cdot n_e$$

From this formula it can be seen that, similarly to the embodiments hereinbefore described, if the eccentricity "e" is increased and therefore also the $\Psi_v$ values, the magnitude of the output revolution rate $n_u$ is also decreased.

The embodiment of FIG. 7 affords the advantage, over the embodiments described in the foregoing, that it is possible to obtain lower revolution rates for the eccentric 17 which drives the deformable bodies.

Hence it is advisable to adopt the embodiments of FIGURES 1 and 3 in those applications in which gearing-up is desired, whereas the embodiment of FIG. 7 is recommended for gearing-downs.

Furthermore, in the embodiment of FIG. 7 the power aliquot transmitted via the deformable bodies is less than in the preceding cases, the ratio between the input and output revolution rates being the same, and the consequence of this is that an increased overall efficiency of the whole device is achieved.

Figure 8:
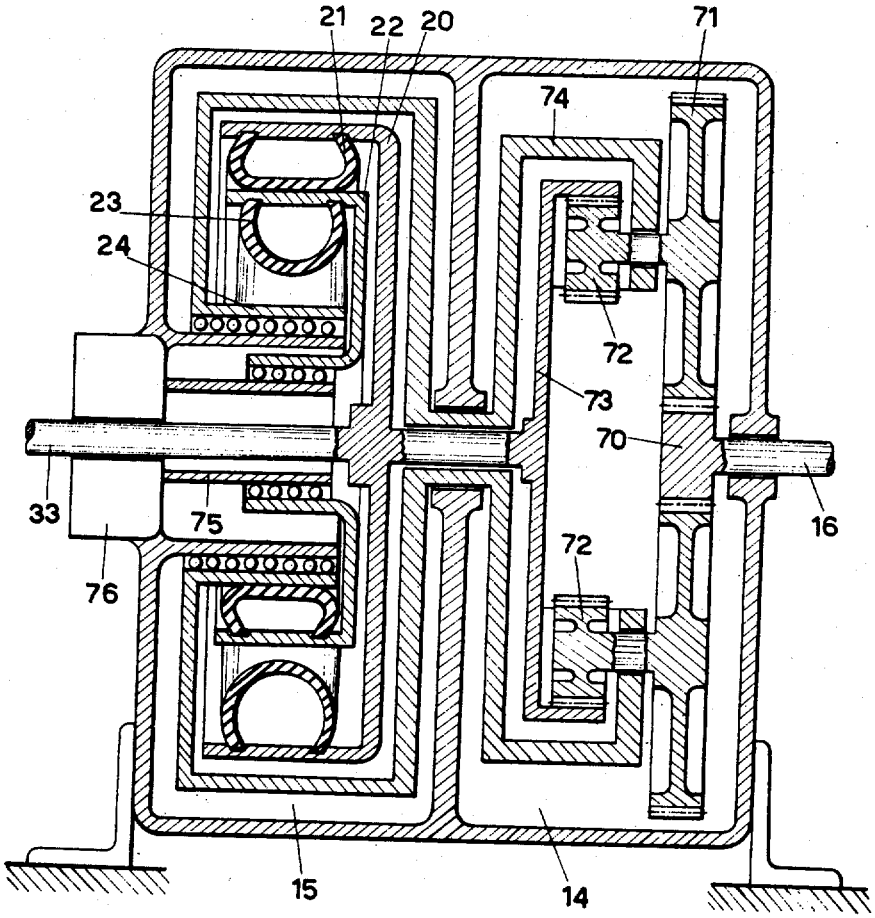
FIGURE 8 is a diagrammatical sectional view of another embodiment of the invention.

FIGURE 8 shows another embodiment of the present invention. In this embodiment the basic difference over all the embodiments described hereinbefore resides in the chamber 15 housing the pneumatic tires. In this chamber, by employing a device diagrammatically shown as 76, in which a mechanism of the kind illustrated in FIG. 2 is housed, the eccentricity of the bushing 75 is varied by manipulating an external control member. On this bushing is loosely mounted the rigid wheel 22 which bears inside the deformable body 23 and engages, with its outer part the deformable body 21. This latter, in turn, is borne by the rim 20 which is keyed to the output or driven shaft 33. The inner deformable body 23, in turn, engages the inner rim 24 which is solidly affixed to the planet gear carrier 74 in the gearbox 14. Differently from the embodiments described hereinbefore, the axis about which the rim 22 rotates in the chamber 15 is therefore in a fixed position in the space, for a certain value of the eccentricity.

In the chamber 14 the input or driving shaft 16 drives the pinion 70 which is in mesh with the gears 71 solid with the gears 72. These latter, in turn, mesh with the internally toothed wheel 73 keyed on the output or driven shaft 33.

The operation of the device is described in a synthetical way by the two formulas to follow in which $\psi_v > 1$ has the same meaning it had in the embodiments already described above and N is the rotation rate of the planetary gear carrier 74.

$$N = \Psi_v n_u$$

$$\frac{n_u - N}{n_e - N} = -\Psi$$

wherein $$\Psi = \frac{r_{70}}{r_{71}} \times \frac{r_{72}}{r_{73}} < 1$$

From the two formulas one obtains:

$$n_u = \frac{\Psi}{\Psi_v(1+\Psi)-1}$$

The embodiment now described, owing to the fact that the chamber 15 has an improved efficiency over the other cases described, is such as to be susceptible of giving very satisfactory results in a number of practical applications.

Other embodiments can be envisaged by skillful combinations or by analogy from those which have been described hereinbefore and these modifications are well within the skill of the calling on the base of what has been disclosed herein.

*In this embodiment, as in the others herein described, obviously the shaft 33 can be the input shaft and the shaft 16 the output shaft. Moreover, the gearing contained in chamber 15 can operate also in the lack of the differential gearing in chamber 14, the rotating member 74 or the rim 24 integral therewith being the prime mover and the shaft 33 being the output shaft as being moved by the driven wheel 20, or vice-versa.*

In particular it is possible to serially arrange a plurality of devices comprising deformable wheels, that is, to arrange said devices so that the output shaft of one of them is connected to the input shaft of the successive or adjacent device of the same kind so as to multiply the speed variation. A plurality of devices according to the invention arranged in parallel can also be provided so that either the input or output shaft of all these devices be connected to one another in order to transfer an amount of power which is the sum of the powers of the individual devices.

I claim:

1. A transmission device comprising a ring, means for preventing rotation of said ring, a pneumatic tire on the inner periphery of said ring, a first shaft coaxial with said ring and carrying a bearing in eccentric position, means for varying the eccentricity of said bearing, a wheel mounted for idle rotation on said bearing and engaging at its outer periphery said pneumatic tire, a second pneumatic tire on the inner periphery of said wheel, a second shaft coaxial with said first shaft, and a second wheel affixed to said second shaft and engaging said second pneumatic tire.

2. A transmission device as claimed in claim 1 in which the diameters of said wheels and of said pneumatic tires are such as to maintain the engagement between said wheels and tires even when the eccentricity of said bearing is zero.

3. A transmission device as claimed in claim 1 having a kinematic chain comprising a third shaft, and means for transmitting to said third shaft resultant angular motion from said first and second shafts.

4. A transmission device as claimed in claim 3 in which said first shaft is the driving shaft and the third shaft is the driven shaft.

5. A transmission device as claimed in claim 3 in which said third shaft is the driving shaft and said first shaft is the driven shaft.

6. A transmission device comprising a ring, means for preventing rotation of said ring, a pneumatic tire on the inner periphery of said ring, a driving shaft coaxial with said ring and carrying a bearing in eccentric position, means for varying the eccentricity of said bearing, a wheel mounted for idle rotation on said bearing and engaging at its periphery said pneumatic tire, a second pneumatic tire on the inner periphery of said wheel, and intermediate shaft coaxial with said driving shaft, a second wheel affixed to said intermediate shaft and peripherally engaging said second pneumatic tire, a driven shaft coaxial with said driving and intermediate shafts and an epicyclic mechanism controlling said driven shaft for rotation at an angular velocity which is a function of the revolution rate of said intermediate shaft.

7. In a transmission device characterized in having an epicyclic gear train, the improvement which comprises a driving shaft, a driven shaft and an intermediate shaft coaxial with said driven shaft and driven at a speed which is a function of the speed of said driving shaft and of said driven shaft, a ring, means for preventing rotation of said ring, a pneumatic tire on the inner periphery of said ring, a bearing carried in eccentric position by said driven shaft, means for varying the eccentricity of said bearing, a wheel mounted for idle rotation on said bearing and engaging at its periphery said pneumatic tire, a second pneumatic tire affixed to the inner periphery of said wheel, and a second wheel affixed to said intermediate shaft and engaging said second pneumatic tire.

8. A transmission device comprising a first shaft bearing a wheel fixed thereon, a first pneumatic tire on the inner periphery of said wheel, a second shaft eccentrically and circumferentially spaced from said first shaft and bearing a second wheel fixed thereon, the outer periphery of which engages said pneumatic tire, a second pneumatic tire carried on the inner periphery of said second wheel, a third shaft aligned with said first shaft and bearing a third wheel fixed thereon, the periphery of which engages said second pneumatic tire, means for varying the eccentricity of said second shaft with respect to said first shaft, a fourth shaft, and an epicycloidal gearing *connected in driving relation with said first and third shafts and* driving said fourth shaft at a speed of rotation which is a function of the rotation rates of said first and third shafts.

9. A transmission device comprising a ring, means for preventing rotation of said ring, a pneumatic tire on the inner periphery of said ring, a driving shaft coaxial with said ring and carrying a bearing in eccentric position, means for varying the eccentricity of said bearing, a wheel mounted for idle rotation on said bearing and engaging at its periphery said pneumatic tire, a second pneumatic tire on the inner periphery of said wheel, an intermediate shaft coaxial with said driving shaft, a second wheel fixed to said intermediate shaft and peripherally engaging said second pneumatic tire, a driven shaft coaxial with said driving and intermediate shafts and a hypocyclic mechanism controlling said driven shaft for rotation at an angular velocity which is a function of the revolution rate of said intermediate shaft.

10. A transmission device as claimed in claim 3 in which said means for transmitting angular motion to said third shaft comprises an internally toothed wheel rigidly mounted on said third shaft, an externally toothed wheel mounted rigidly on said second shaft, an eccentric pin carried by said first shaft, and a gear wheel rotatably mounted on said eccentric pin, said gear wheel having internal and external teeth which hypocyclicly mesh with said externally toothed wheel and said internally toothed wheel, respectively.

11. A transmission device as claimed in claim 6 having a kinematic chain connected to said intermediate shaft whereby the driven shaft may be rotated in a direction opposite to the direction of rotation of said driving shaft.

12. A transmission device as claimed in claim 11 having a second intermediate shaft coaxial with said driving shaft and interposed between said first mentioned intermediate shaft and said driven shaft, said second intermediate shaft being rotated by means of said kinematic chain in a direction opposite to the direction of rotation of said driving shaft, and a differential hypocyclic mechanism connected to said driven shaft and actuated by said second intermediate shaft.

13. A transmission device as claimed in claim 12 in which said hypocyclic mechanism comprises an externally toothed wheel keyed to the driving shaft, an internally toothed wheel keyed to the driven shaft and a plurality of planetary gears carried by said second intermediate shaft and meshing with said two toothed wheels.

14. A continuously variable ratio transmission device comprising [two] *first and second* wheels frictionally engaging each other at their peripheries, *the first* one of said wheels being non-rotatable, at least one of said wheels being deformable in a radial direction by external compression exerted by the second of said wheels, support means rotatably carrying [at least] *said second* one of said wheels, and means for positively and adjustably displacing said support means in a radial direction with respect to the [rotation] axis of said *first* [second mentioned] wheel.

15. A continuously variable ratio transmission device comprising [two] *first and second* wheels frictionally enengaging each other at their peripheries, *the first* one of said wheels being mounted for idle rotation and being equipped with braking means, at least one of said wheels being deformable in a radial direction by external compression exerted by the second of said wheels, support means rotatably carrying [at least] *said second* one of said wheels, and means for positively and adjustably displacing said support means in a radial direction with respect to the [rotational] axis of said *first* [second mentioned] wheel.

16. A continuously variable ratio transmission device comprising [two] *first and second* wheels frictionally engaging each other at their peripheries, *the first* one of said wheels having an epicyclic motion with respect to the [other] *second* wheel with which it is frictionally engaged, [means for varying the eccentricity of said one wheel with respect to the other,] at least one of said wheels being deformable in a radial direction by external compression exerted by the second of said wheels, support means rotatably carrying [at least] *the first* one of said wheels, and means for positively and adjustably displacing said support means in a radial direction with respect to the [rotational] axis of said second [mentioned] wheel.

*17. A transmission device comprising a first shaft bearing a wheel fixed thereon, a first pneumatic tire on the inner periphery of said wheel, a second shaft eccentrically and circumferentially spaced from said first shaft and bearing a second wheel fixed thereon, the outer periphery of which engages said pneumatic tire, a second pneumatic tire carried on the inner periphery of said second wheel, a third shaft aligned with said first shaft and bearing a third wheel fixed thereon, the periphery of which engages said second pneumatic tire, and means for varying the eccentricity of said second shaft with respect to said first shaft.*

*18. A transmission device comprising a first wheel mounted for rotation on a first axis, a first pneumatic tire on the inner periphery of said first wheel, a second wheel mounted for rotation on a second axis which is parallel to said first axis, the outer periphery of said second wheel engaging said first pneumatic tire, a second pneumatic tire carried on the inner periphery of said second wheel, a third wheel mounted for rotation on said first axis, the periphery of said third wheel engaging said second pneumatic tire, and means for varying the position of said second wheel so that said second axis is moved relative to said first axis.*

References Cited in the file of this patent or the original patent

UNITED STATES PATENTS

| | | |
|---|---|---|
| 792,477 | Swedlund | June 13, 1905 |
| 1,315,970 | King | Sept. 16, 1919 |
| 1,370,080 | Ahond | Mar. 1, 1921 |
| 2,049,696 | Fliesberg | Aug. 4, 1936 |
| 2,106,237 | Bush | Jan. 25, 1938 |
| 2,111,422 | Fawick | Mar. 15, 1938 |
| 2,308,090 | MacFarren | Jan. 12, 1943 |
| 2,311,597 | Schmitter | Feb. 16, 1943 |

FOREIGN PATENTS

| | | |
|---|---|---|
| 329,811 | Great Britain | May 29, 1930 |